(No Model.)
E. C. CONVERSE.
TUBE COUPLING.
No. 283,972. Patented Aug. 28, 1883.
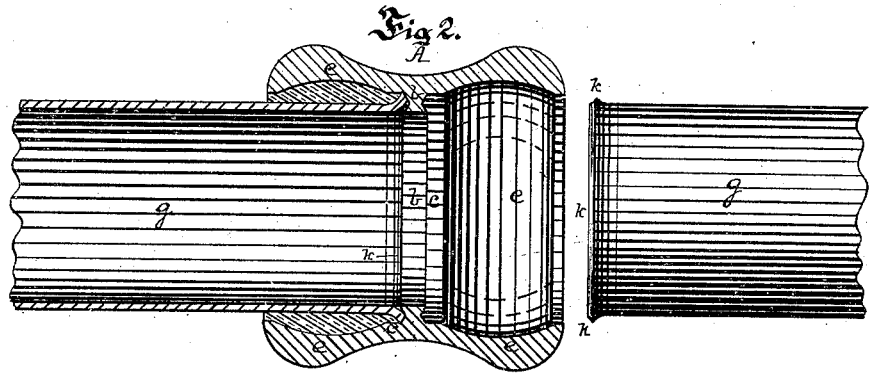
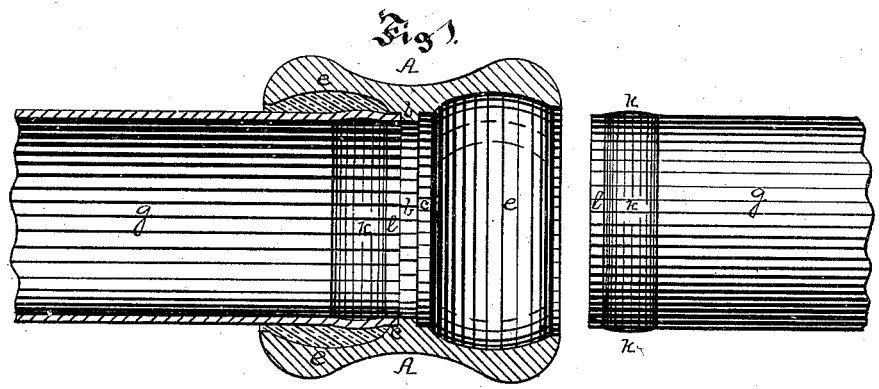
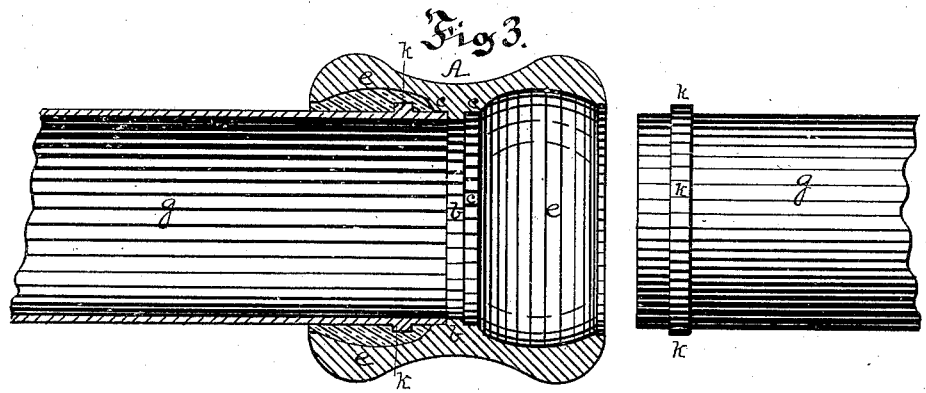
Witnesses.
Inventor.
Edmund C. Converse
by James I. Kay
Attorney

UNITED STATES PATENT OFFICE.

EDMUND C. CONVERSE, OF PITTSBURG, PENNSYLVANIA.

TUBE-COUPLING.

SPECIFICATION forming part of Letters Patent No. 283,972, dated August 28, 1883.

Application filed March 8, 1883. (No model.)

*To all whom it may concern:*

Be it known that I, EDMUND C. CONVERSE, of Pittsburg, in the county of Allegheny and State of Pennsylvania, have invented a new and useful Improvement in Tube-Couplings, (Case B;) and I do hereby declare the following to be a full, clear, and exact description thereof, reference being had to the accompanying drawings, forming a part of this specification, in which—

My invention relates to couplings used for connecting thin or light wrought-metal tubing, its object being to provide an efficient coupling for this light metal tubing whereby the several lengths of tubing can be connected without cutting into or weakening it, as is the case where the ordinary screw-threaded couplings or sockets are employed.

My invention consists, essentially, in a coupling collar or sleeve for tubing, having an inner central ring, an inner face on each side thereof to support the end of the tubing, and an annular calking-recess at each end for the reception of lead or other calking material, said calking-recesses having inwardly-flaring sides to hold the calking material more securely, and to enable it to stand without displacement the internal pressure of the fluid in the tubing.

It also consists in combining with a coupling collar or sleeve, provided with annular inwardly-flaring calking-recesses at each end, thin metal tubing having enlargements at or near the ends, and adapted to fit within the calking-recesses, so that the calking material will fit against or around the enlargements, and the tubing be held within the collar by means of the calking material confined between the enlargements and the inwardly-flaring sides of the calking-recesses.

It also consists in combining with this coupling collar or sleeve the thin metal tubing having expanded portions near the ends thereof, which expanded portions are held within the collar by the lead confined between them and the inwardly-flaring sides of the calking-recesses, as above described.

To enable others skilled in the art to make and use my invention, I will describe its construction and manner of use, referring for that purpose to the accompanying drawings, in which—

Figure 1 is a longitudinal section of my improved coupling where the enlargements are formed by expanding the metal of the pipe near the ends thereof. Fig. 2 is a like view where the enlargements are formed by flaring lips on the ends of the tubing; and Fig. 3 is a like view where the enlargements are formed by welding, shrinking, or riveting rings or lugs near the ends of the tubing.

Like letters of reference indicate like parts in each.

In the drawings, A represents the coupling collar or sleeve, which is preferably formed with an annular ring or flange, $b$, at or near the center thereof, so as to form annular shoulders on each side thereof, against which the ends of the tubing butt or bear. On each side of the central ring, $b$, are the inner faces, $c$, of the collar, these faces being of diameter corresponding to the ends of the tubing, and supporting the tubing at the ends entirely around their circumference. Where, however, the annular ring or flange $b$ is not employed, the inner face, $e$, will extend entirely across the center of the coupling-collar. At each end of the coupling-collar A are the annular calking-recesses $e$, for the reception of lead or other suitable calking material, these calking-recesses being formed inwardly flaring, being of larger diameter at the base or between the base and mouth than at the mouth, for the purposes hereinafter set forth.

The tube-sections $g$ employed are what are termed "light metal tubing," being formed of wrought metal, and being too thin and light to receive the ordinary screw-thread employed to connect the ordinary wrought-metal tubing. The tube-sections have enlargements $k$ at or near the ends thereof, and different constructions of these enlargements are illustrated in the drawings.

In Fig. 1 the enlargement $k$ is formed by expanding the tubing a short distance from the end thereof, the annular expanded portions thus formed increasing slightly the diameter of the tubing, but not injuriously weakening it. The expanded portions $k$ fit within the collar, the portions $l$ of the tubing beyond the enlargements fitting within the inner faces, $c$, and the ends against the inner central ring, $b$, and the lead or other calking material is poured and calked or packed around the tubing within the annular calking-recesses $e$, a large body of the calking material being confined between the annular expanded portions and the inwardly-flaring mouths of the calking-recesses.

In Fig. 2 the enlargement $k$ is formed by flaring annular lips around the ends of the tubing, and in this case the inner faces, $c$, are made somewhat deeper to receive these lips on the tubing. The calking material fills the spaces in the collar between the tubing and the inner faces, $c$, and inwardly-flaring calking-recesses $e$.

In Fig. 3 the enlargements $k$ are formed by welding, shrinking, or riveting to the tubing rings of metal a short distance from the ends thereof, and the calking material fills the spaces between the tubing and rings and the inwardly-flaring calking-recesses. The enlargements may also be formed by expanding lugs out of the body of the tubing at different points near the ends thereof, or riveting or welding the lugs thereon.

When my improved tube-coupling is employed, the tube-sections are inserted within the coupling collar or sleeve, the ends fitting within the inner face or faces, $c$, thereof, and being supported from internal pressure thereby, and the enlargements $k$ of the tubing being within or beyond the annular inwardly-flaring calking-recesses. Where the inner central ring is employed, the ends of the tubing butt or bear against it, and the tubing is thus directed to proper position thereby. The lead or other calking material is then poured and calked or packed in the inwardly-flaring calking-recesses, and the coupling is made. As the enlargements are within the collar, and a large body of calking material is confined between these enlargements and the inwardly-flaring mouths of the calking-recesses, it is evident that the tubing is held within the coupling-collar by these enlargements, and that to withdraw the tubing therefrom this large body of calking material would necessarily be forced through the narrow spaces between the tubing and mouths of the collar, as will be clearly seen from an inspection of the drawings. The calking material also binds around the body of the tubing, and thus aids in holding it within the collar. The tubing is thus securely held within the collar against longitudinal or drawing strain consequent to the expansion and contraction of the wrought-metal tubing under alternations of heat, or from other cause. The formation of the expanded portions, as shown in Fig. 1, or the flared lips, as shown in Fig. 2, to form the enlargements $k$, do not materially weaken this light metal tubing, as the requisite amount of expansion or flaring is very slight, and in case the tubing should be weakened the large body of calking material between these enlargements and the mouths of the coupling-collar will effectually prevent leakage.

The coupling thus formed has been found to form a secure and tight joint for this light metal tubing, and one that will withstand all ordinary pressure strains.

No claim is made herein to the special constructions shown in Figs. 2 and 3, these being made the subjects of separate applications for Letters Patent.

What I claim as my invention, and desire to secure by Letters Patent, is—

1. In couplings for tubing, a coupling collar or sleeve having an inner central ring, an inner face on each side of said ring, and an annular calking-recess at each end, said calking-recesses having inwardly-flaring sides, substantially as and for the purposes set forth.

2. In combination with a coupling collar or sleeve provided with annular inwardly-flaring calking-recesses at the ends thereof, thin metal tubing having enlargements at or near the ends thereof, and adapted to enter the collar and be held therein by the calking material confined between the enlargements and the mouths of the collar, substantially as set forth.

3. In combination with a coupling collar or sleeve provided with inner faces at or near the center, and annular inwardly-flaring calking-recesses at the ends thereof, tubing having enlargements at or near the end thereof, and adapted to enter the collar, so that the ends fit within said inner faces and be held within the collar by the calking material confined between the enlargements and the mouths of the collar, substantially as set forth.

4. In combination with a coupling collar or sleeve provided with annular inwardly-flaring calking-recesses at the ends thereof, thin metal tubing having annular expanded portions near the ends thereof, and adapted to enter the collar and be held therein by the calking material held between the expanded portions and the mouths of the collar, substantially as set forth.

In testimony whereof I, the said EDMUND C. CONVERSE, have hereunto set my hand.

EDMUND C. CONVERSE.

Witnesses:
CHAS. C. DORR,
WM. L. HURD.